United States Patent [19]

Wang et al.

[11] Patent Number: 5,244,853
[45] Date of Patent: Sep. 14, 1993

[54] CATALYST COMPONENT FOR ETHYLENE POLYMERIZATION

[75] Inventors: Bor-Ping E. Wang, Peekskill; Elliot I. Band, North Tarrytown, both of N.Y.

[73] Assignee: Akzo N.V., Arnhem, Netherlands

[21] Appl. No.: 920,090

[22] Filed: Jul. 27, 1992

[51] Int. Cl.$^5$ .............................................. C08F 4/654
[52] U.S. Cl. .................................... 502/116; 502/115; 502/119; 502/125; 526/125
[58] Field of Search ................ 502/115, 116, 119, 125

[56] References Cited

U.S. PATENT DOCUMENTS 5,063,188  11/1991  Malpass et al. ...................... 502/116

Primary Examiner—Patrick P. Garvin
Attorney, Agent, or Firm—Richard P. Fennelly; Louis A. Morris

[57] ABSTRACT

Catalyst components for the polymerization of an olefin, such as ethylene, are formed by reacting, in a single reaction step, an organomagnesium compound, an alkoxy silane, and a chlorinating reagent.

5 Claims, No Drawings

CATALYST COMPONENT FOR ETHYLENE POLYMERIZATION

BACKGROUND OF THE INVENTION

This invention relates to a catalyst component in the form of solid particle which has attractive properties as the carrier of a catalyst for olefin polymerization. In general, it is desired that the carrier of a catalyst for olefin polymerization have a relatively large particle size and a relatively narrow particle size distribution which are characteristics that are particularly sought in catalysts for use in gas phase polymerizations. It is known to polymerize alpha olefins, such as ethylene, using a catalyst component comprising titanium on magnesium halide or magnesium alkoxide support, the component being obtained by either copulverization or by direct reaction with a liquid titanium compound containing halogen. Such a component is then used in the polymerization reaction with a trialkylaluminum cocatalyst, e.g., triisobutylaluminum.

DESCRIPTION OF THE INVENTION

In U.S. Pat. No. 5,063,188, which is incorporated herein in its entirety by reference, a catalyst component for ethylene polymerization (including copolymerization) is formed by first reacting an organomagnesium compound with an alkoxysilane to replace the organo groups on the organomagnesium compound with alkoxy to yield a product comprising magnesium alkoxide (e.g., magnesium ethoxide), followed by contacting the resulting product with chlorinating agent (e.g., silicon tetrachloride) and then liquid titanium halide. In such a procedure, the magnesium alkoxide product from the first step is produced in the form of a gel-like solid which is isolated and washed prior to the later reaction steps. It has been found that such a procedure, although producing a useful product, yields a catalyst component which has a somewhat smaller than desired particle size and a wider than desired particle size distribution than desired for some commercial embodiments.

The inventors have studied and found that the particle size of the aforementioned catalyst carrier can be varied by changing the ratio of the reaction components which include silicon halide, alkoxy silicon compound, and organomagnesium and that the aforementioned problems regarding particle size and particle size distribution of the catalyst component resulting from the isolation of the magnesium alkoxide intermediate can be avoided if the process of U.S. Pat. No. 5,063,188 is modified by reacting the organomagnesium compound, alkoxy silane, and chlorinating reagent in a single step.

The organomagnesium compound which can be used in the present invention is a dialkylmagnesium compound having from one to about eight carbon atoms in the alkyl group, such as butylethylmagnesium, dibutylmagnesium, diisobutylmagnesium, and dihexylmagnesium.

The alkoxysilane reagent which can be used in the present invention can be represented by such compounds as tetraethyl silicate, tetramethyl silicate, and dimethoxydiphenylsilane.

The chlorinating agent useful in the instant invention includes carbon tetrachloride, titanium tetrachloride, silicon tetrachloride, and methyl trichlorosilane.

The catalyst carrier and catalyst components of this invention have relatively narrow particle size distribution (PSD). The term "narrow PSD" as defined by the "span" of the particle size distribution being equal or less than about 1. The span is defined as:

$$\text{Span} = D(90) - D(10)/D(50)$$

where $D(90)$, $D(50)$ and $D(10)$ are the 90, 50 and 10 percentile, respectively, of the cumulative particle size distribution.

The component in the catalyst carrier of the present invention is a chloromagnesium alkoxide-containing material which is preferably formed from silicon tetrachloride, tetraethoxysilane, and butylethylmagnesium (BEM). The reaction, in a preferred embodiment starts at 5° C. with the addition of tetraethoxysilane and silicon tetrachloride to the organomagnesium reagent. After the addition is complete, the temperature of the solution is then gradually raised at the rate of 1° C./min until refluxing commences. During this temperature increase, a solid product begins to precipitate out. Changing the ratio of SiCl₄/BEM, will change the composition of the resulting catalyst carrier as well as its particle size. For example, as the amount of silicon tetrachloride is reduced, the particle size of the catalyst carrier is increased. The resulting solid is then react with a liquid titanium compound containing halogen is contacted with the activated solid carrier at elevated temperature.

The catalyst component and trialkylaluminum cocatalyst can be used in a slurry polymerization. The molar amount used preferably ranges from about 150:1 to about 100:1 based on the titanium content of catalyst component. The catalyst of the present invention has been found to have narrower particle size distribution (PSD) compared to the catalyst obtained from stepwise method shown in U.S. Pat. No. 5,063,188. In addition, catalyst is active and very sensitive to hydrogen pressure during polymerization.

The following Examples are intended to further describe the present invention for purposes of further illustration.

EXAMPLE 1

This Example illustrates preparation of a catalyst carrier for use in the preparation of a catalyst in accordance with the present invention.

A one liter three-necked flask was equipped with a mechanical stirrer, condenser, and a gas inlet/outlet adapter. The system was purged with nitrogen for thirty minutes replacing the atmosphere with nitrogen. Then, 215 g of a butylethylmagnesium (BEM)/heptane solution (0.3928 mole Mg) was added to the flask through a cannula followed by the addition of 230 g of dry heptane. With stirring (200 rpm), the flask was cooled to 5° C. by using a heptane/dry ice bath, and 59.4 g of Si(OEt)₄ (0.2851 mole Si) was added slowly into the solution. Since the ensuing complexation reaction was exothermic, the addition rate was appropriately adjusted to control the isotherm. After the addition had been completed, 67.9 g of SiCl₄ (0.399 mole Si) was added quickly into the solution by syringe. The ratio of SiCl₄/Si(OEt)₄/BEM Was 1.02:0.73:1.00. The solution temperature was then raised gradually by the rate of 1° C./min until reflux. During the temperature rise, a solid product started to precipitate out of solution. Stirring of the reaction solution under reflux temperature for one hour was conducted to insure that the BEM reagent was consumed. The solid product from the reaction was filtered through a fine frit filter and was washed with 600 ml of heptane. After vacuum drying, the yield of product was 52.9 g. The component contained 17.4 wt % Mg, 39.3 wt % Cl, and 23.1 wt % ethanol.

EXAMPLE 2

This Example illustrates preparation of another catalyst carrier which can be used in the preparation of a polymerization catalyst in accordance with the present invention.

A one liter three-necked flask was equipped with mechanical stirrer, condenser, and a gas inlet/outlet adapter. The system was purged with nitrogen for thirty minutes replacing the atmosphere with nitrogen. Then, 226.8 g of BEM/heptane solution (0.419 mole Mg) was added to the flask through a cannula followed by the addition of 182.5 g of dry heptane. Under stirring (200 rpm), the flask was cooled to 5° C by using a heptane/dry ice bath, and 63.6 g of $Si(OEt)_4$ (0.305 mole Si) was then added slowly into the solution. The addition rate was adjusted to control the exotherm. After the addition was completed, 34.7 g of $SiCl_4$ (0.204 mole Si) was added quickly into the solution by syringe. The ratio of $SiCl_4/Si(OEt)_4$/BEM was 0.49:0.73:1.00. The solution was then gradually raised in temperature at the rate of 1° C./min until reflux. During the temperature rise, a solid started to precipitate out of solution. Stirring under reflux temperature for one hour was conducted to make sure that the BEM reagent had been consumed. The solid product from the reaction was filtered through a fine frit filter, and was washed with 600 ml heptane. After vacuum drying, the yield of product was 59.6 g and the resulting catalyst component contained 13.6 wt % Mg, 31.7 wt % Cl, and 28.0 wt % ethanol.

EXAMPLE 3

This Example illustrates another preparation of a catalyst carrier or component in accordance with the present invention.

A one liter three-necked flask was equipped with mechanical stirrer, condenser, and a gas inlet/outlet adapter. The system was purged with nitrogen for thirty minutes replacing the atmosphere with nitrogen. To the flask were then added 233.2 g of a BEM/heptane solution (0.431 mole Mg) through a cannula followed by adding 125 g of dry heptane. Under 200 rpm stirring speed, the flask was cooled to 5° C. by using a heptane/dry ice bath. Then, 64.6 g of $Si(OEt)_4$ (0.311 mole Si) was added slowly into the solution. The addition rate was adjusted as earlier indicated to control the exotherm. After the addition had been complete, 23.8 g of $SiCl_4$ (0.140 mole Si) was added quickly into the solution by syringe. The ratio of $SiCl_4/Si(OEt)_4$/BEM was 0.33:0.72:1.00. The solution temperature was then raised gradually at the rate of 1° C./min until reflux. During the temperature rise, a solid product started to precipitate out of solution. Stirring at the reflux temperature was performed for one hour to insure that the BEM reagent had been consumed. The solid product was filtered through a fine frit filter and was washed with 600 ml heptane. After vacuum drying, the yield of product was 59.5 g. The resulting catalyst component contained 17.2 wt % Mg and 28.7 wt % Cl.

EXAMPLE 4

This Example illustrates another preparation of a catalyst carrier accordance with the present invention.

A five liter three-necked flask was equipped with mechanical stirrer, condenser, and a gas inlet/outlet adapter. The system was purged with nitrogen for thirty minutes replacing the atmosphere with nitrogen. To the flask was then added 1711 g of a BEM/heptane solution (3.140 mole Mg) through a cannula followed by adding 877.2 g of dry heptane. Under 400 rpm stirring speed, the flask was cooled to 5° C. by using a heptane/dry ice bath, and 497.7 g of $Si(OEt)_4$ (2.389 mole Si) was added slowly into the solution, the addition rate being adjusted to account for the exothermic reaction. After the addition was completed, 135.7 g of $SiCl_4$ (0.799 mole Si) was added quickly into the solution by syringe. The ratio of $SiCl_4/Si(OEt)_4$/BEM was 0.25:0.76:1.00. The solution was then raised in temperature gradually by the rate of 1° C./min until reflux. During the temperature rise, a solid started to precipitate out of solution. Stirring was continued under reflux temperature for one hour to insure that the BEM reagent was consumed. The solid was filtered through a fine frit filter and was washed with 600 ml of heptane. After vacuum drying, the yield of product was approximately 560 g.

EXAMPLE 5

This Example illustrates preparation of a supported catalyst from catalyst component of Example 1 in accordance with this invention.

Inside a dry box under nitrogen, 15.28 g (0.109 mole Mg) of the solid product from Example 1 was charged into a 500 ml three-necked bottom frit flask which was equipped with a mechanical stirrer, condenser, and gas inlet/outlet adapter. Then, 90 g of dry heptane was transferred into the flask. Using a 200 rpm stirring speed, under nitrogen, 103.8 g of $TiCl_4$ (0.547 mole) was then added to the flask at ambient temperature. The solution was heated to reflux temperature (98° C.). The reaction mixture was then stirred at refluxing temperature for one hour. The supernatant was removed by using positive nitrogen pressure to push it through fine frit filter. The remaining solid was washed with hot toluene (200 ml×3) and hot heptane (200 ml×2). After vacuum drying, the yield for the catalyst component was 14.6 g of a light tan powder. The component contained 4.1 wt % Ti, 18.1 wt % Mg, and 53.4 wt % Cl.

EXAMPLE 6

This Example illustrates preparation of a supported catalyst from the catalyst component of Example 2.

Inside a dry box under nitrogen, 18.9 g (0.106 mole Mg) of the solid product from Example 2 was charged into a 500 ml three-necked bottom frit flask which was equipped with a mechanical stirrer, condenser, and gas inlet/outlet adapter. Then, 175 g of dry heptane was transferred into the flask. Using a 200 rpm stirring speed, under nitrogen, 7.7 g of $TiCl_4$ (0.041 mole) was then added to the flask at ambient temperature. The solution was heated to reflux temperature (98° C.), and the reaction mixture was then stirred at that reflux temperature for one hour. The supernatant was removed by using positive nitrogen pressure to push it through a fine frit filter. The remaining solid was washed with hot toluene (200 ml×3) and hot heptane (200 ml×2). After vacuum drying, the yield for the catalyst component was 19.6 g of light tan powder The component contained 4.6 wt % Ti, 15.5 wt % Mg, and 46.0 wt % Cl.

EXAMPLE 7

This Example illustrates preparation of a supported catalyst from the catalyst carrier of Example 2.

Inside the dry box under nitrogen, 2.12 g (0.119 mole Mg) of the solid product from Example 2 was charged into a 500 ml three-necked bottom frit flask which was equipped with a mechanical stirrer, condenser, and gas inlet/outlet adapter. Then, 159 g of dry heptane was transferred into the flask. Using a 200 rpm stirring speed, under nitrogen, 1.2 g of $TiCl_4$ (0.006 mole) was added to the flask at ambient temperature. The solution was heated to reflux temperature (98° C.), and the reaction mixture was then stirred at the reflux temperature for one hour. The supernatant was then removed by using positive nitrogen pressure to push it through a fine frit filter. The remaining solid was washed with hot toluene (200 ml×3) and hot heptane (200 ml×2). After vacuum drying, the yield for the catalyst component was 19.6 g of light tan powder. The component contained 1.7 wt % Ti, 17.7 wt % Mg, and 38.1 wt % Cl.

EXAMPLE 8

This Example illustrates preparation of a supported catalyst from the Example 3.

Inside the dry box under nitrogen, 18.4 g (0.130 mole Mg) of the solid product from Example 3 was charged into a 500 ml three-necked bottom frit flask which was equipped with a mechanical stirrer, condenser, and gas inlet/outlet adapter. Then, 151.8 g of dry heptane was transferred into the flask. Using a 200 rpm stirring speed, under nitrogen, 3.54 g of $TiCl_4$ (0.019 mole) was added to the flask at ambient temperature. The solution was heated to reflux temperature (98° C.), and the reaction mixture was then stirred at refluxing temperature for one hour. The supernatant was removed by using positive nitrogen pressure to push it through a fine frit filter. The remaining solid was washed with hot toluene (200 ml×3) and hot heptane (200 ml×2). After vacuum drying, the yield for the catalyst component was 19.4 g of light tan powder. The component contained 4.4 wt % Ti, 16.3 wt % Mg, and 40.8 wt % Cl. The span of the catalyst particles was 1.00.

EXAMPLE 9

This Example illustrates preparation of the supported catalyst from the catalyst carrier of Example 4.

About 560 g of the solid product from Example 4 was charged into a five liter three-necked flask which was equipped with mechanical stirrer, condenser, and gas inlet/outlet adapter. Then, 1362.9 g of dry heptane was transferred into the flask. Using a 400 rpm stirring speed, under nitrogen, 208.1 g of $TiCl_4$ (1.097 mole) was added to the flask at ambient temperature. The solution was heated to reflux temperature (98° C.). The reaction mixture was then stirred at the refluxing temperature for one hour. The supernatant was removed by using positive nitrogen pressure to push it through a cannula. The remaining solid was washed with heptane (2 1×12). After vacuum drying, the yield for the catalyst component was about 560 g of a brown powder. The component contained 8.0 wt % Ti, 13.5 wt % Mg, and 43.6 wt % Cl. The span of the catalyst particle was 0.71.

EXAMPLE 10–13

These Examples illustrate the general procedure for the slurry polymerization of ethylene employing the catalyst carrier and catalyst of this invention.

A stainless-steel one liter Zipper Clave reactor equipped with a mechanical stirrer and temperature controller was purged with nitrogen and pickled with triisobutylaluminum/hexane solution after being rinsed with dry heptane and then charged with 500 ml n-hexane which had been amply dehydrated and deoxygenated. A syringe assembly was used to add the triisobutylaluminum cocatalyst. A total amount of 1.5 to 2.0 mmol aluminum was introduced. A mineral oil catalyst slurry (1.0 ×10$^{-5}$ to 1.5×$^{-5}$ mole Ti) was then charged to the vessel under nitrogen purging. The contents were then heated to 55° C., and hydrogen was charged and vented several times to sparge nitrogen from reactor. Then, a specific amount of hydrogen was charged to the vessel as a polymerization moderator. After reactor temperature reached 80° C., ethylene (100 to 130 psig) was introduced to the reactor. The standard polymerization temperature was 85±1° C. After sixty minutes, polymerization was terminated by blocking the flow of ethylene and subsequently venting and cooling the vessel. Polyethylene was isolated as a white powder. Melt index (MI) and high load melt index (HLMI) were measured using ASTM-1238 Conditions E and F, respectively. The melt index ratio was obtained by dividing HLMI by MI and is a measure of molecular weight distribution (MWD). A low MIR indicates a narrow MWD.

The Table set forth below shows the homopolymerization test results using the supported catalysts of Example Nos. 5 and 9 under differing conditions:

TABLE 1

| | | | Homopolymerization[1] Test Results | | | | | |
|---|---|---|---|---|---|---|---|---|
| CAT. | $H_2$ psig | $C_2H_4$ psig | P kg PE/g CAT × 10$^4$ | $M_w$ | $M_n$ × 10$^3$ | MWD | MFI[2] g/10 min | PBD g/ml |
| No. 5 | 40 | 110 | 5.1 | 4.3 | 8.7 | 5.0 | 56.7 | 0.278 |
| No. 5 | 20 | 130 | 11.3 | 8.3 | 14.2 | 5.9 | 11.1 | 0.312 |
| No. 9 | 40 | 110 | 2.8 | 4.6 | 12.0 | 4.0 | 44.8 | 0.255 |
| No. 9 | 20 | 130 | 4.1 | 11.6 | 24.0 | 4.8 | 4.9 | 0.276 |

[1]Polytest conditions: 500 ml hexane, TIBAL @ ambient temperature, $H_2$ @ 55° C., ethylene to 150 psig @ 85° C., 60 minutes.
[2]Melt Index = ASTM D-1238, Condition E.

EXAMPLES 14–15

These Examples illustrate the general procedure for the slurry copolymerization of ethylene and hexene-1 employing the catalyst carrier and catalyst of this invention.

A stainless-steel 1 liter Zipper Clave reactor equipped with a mechanical stirrer and temperature controller was purged with nitrogen and pickled with triethylaluminum/hexane solution. After a rinse with dry hexane it was then charged with 600 ml of n-hexane which had been amply dehydrated and deoxygenated. A syringe assembly was used to add the triethylaluminum cocatalyst. A total amount of 1.5 to 2.0 mmol aluminum was introduced. A mineral oil catalyst slurry ($1.0 \times 10^{-5}$ to $1.5 \times 10^{-5}$ mole Ti) was then charged to the vessel under nitrogen purging. The contents were then heated to 60° C. and 10 psig hydrogen, and 40 ml of hexene-1 were charged to the reactor. After the reactor temperature reached 84° C., 150 psig of ethylene was introduced to the reactor. The standard copolymerization temperature was 85±1° C. After 60 minutes, polymerization was terminated by blocking the flow of ethylene and subsequently venting and cooling the vessel. The product was isolated as a white powder. Melt index (MI) and high load melt index (HLMI) were measured using ASTM-1238 Condition E and Condition F. The melt index ratio is obtained by dividing HLMI by MI and considered a measure of molecular weight distribution (MWD). Low MIR indicates narrow MWD.

Table 2 gives the copolymerization results which were obtained using the catalyst from Examples 5 and 9:

TABLE 2

| Cat. | Charge mg | Al/Ti | Copolymerization[1] Test Results Activity Kg PE/gTi · atm · hr | HLMI[2]/LLMI[3] g/10 min | MFR | Density g/ml |
|---|---|---|---|---|---|---|
| No. 9 | 21.7 | 78 | 6.7 | 56.65/1.82 | 31.1 | 0.938–0.942 |
| No. 5 | 10.6 | 100 | 35.3 | 95.75/2.76 | 34.7 | 0.938–0.942 |

[1]Copolymerization test conditions: Catalyst, 70–100 TEAL/Ti, H$_2$ at 10 psig and 40 ml hexene-1 added to a 1 L reactor with 600 ml hexane at 60° C. Reactor brought to 84° C., ethylene admitted at 150 psig, and polymerized for 1 hour. Polymerization temperature = 85° C.
[2]ASTM D-1238, Condition F Melt Index, 190° C., 21.6 Kg.
[3]ASTM D-1238, Condition E Melt Index, 190° C., 2.16 Kg.

COMPARATIVE EXAMPLE 16

This Example illustrates preparation of a broad particle size distribution catalyst carrier with the stepwise method of U. S. Pat. No. 5,063,188.

A one liter two-necked flask was equipped with two stopcocks and a TEFLON fluoropolymer-coated stirring bar. The system was evacuated three times by replacing the atmosphere inside the flask with nitrogen. To this flask was then added 320 ml of heptane through a cannula. A syringe was used to add 243.6 g of a butylethylmagnesium (BEM) /heptane solution (0.45 mole Mg) into the flask. Under rapid stirring, 100 ml of Si(OEt)$_4$ (0.45 mole Si) was charged into the flask by syringe. The solution was heated to reflux temperature. A white precipitate was formed gradually. The mixture was stirred for one hour at reflux temperature until the BEM was consumed. The solid was recovered and was washed with one liter of heptane, and was vacuum dried. Inside a dry box under nitrogen, 32.1 gm (0.236 mole Mg) of the solid product from Example 1 was charged into a 500 ml two-necked flask equipped with two stopcocks and a Teflon fluoropolymer-coated stirring bar. About 300 ml of pure heptane was charged into the flask through a cannula. With stirring, under nitrogen, 39.9 gm (0.235 mole Si) SiCl$_4$ was added dropwise into the flask at ambient temperature. The solution was heated to 90°–95° C. The mixture was stirred at this temperature for one hour. The supernatant was removed by cannula, and the remaining solid was washed with one liter of heptane. The final product was dried under vacuum. Inside a dry box under nitrogen, 34.2 gm (0.215 mole Mg) of the solid product from Example 2 was charged into a 500 ml two-necked flask equipped with two stopcocks and a Teflon fluoropolymer-coated stirring bar. About 250 ml of pure heptane was transferred into the flask. With stirring, under nitrogen, 12.98 gm TiCl$_4$ (0.068 mole Ti) was slowly added to the flask at ambient temperature. The solution heated to reflux temperature (98° C.). The reaction mixture was stirred at refluxing temperature for one hour. The supernatant was removed by cannula, and the remaining solid was washed with two liters of pure heptane. After vacuum drying, the yield from the catalyst component was 37.8 gm of a pale brown powder. The span of the catalyst particle was 3.38.

EXAMPLE 17

A variety of the catalyst carrier or supported catalysts previously described were analyzed for certain of their chemical and physical characteristics. The results are shown in Table 3 which follows:

TABLE 3

| Example No. | Mg wt % | Ti wt % | Cl wt % | SiCl$_4$/Si(OEt)$_4$/BEM mole ratio | Titanation Mg/Ti | PSD (P50) microns |
|---|---|---|---|---|---|---|
| 1 | 17.4 | | 39.3 | 1.02/0.73/1.00 | | 8.9 |
| 2 | 13.6 | | 31.7 | 0.49/0.73/1.00 | | 15.7 |
| 3 | 17.2 | | 28.7 | 0.33/0.72/1.00 | | 26.0 |
| 5 | 18.0 | 4.1 | 53.4 | | 1/5 | 7.4 |
| 6 | 15.5 | 4.6 | 46.1 | | 2.6/1 | 16.7 |
| 8 | 16.3 | 4.4 | 40.8 | | 7.0/1 | 26.5 |
| 9 | 13.5 | 8.0 | 43.6 | 0.25/0.76/1.00 | 3.3/1 | 38.0 |

EXAMPLE 18

Table 4 set forth below shows the particle size distribution for a variety of the materials synthesized in certain of the preceding Examples:

TABLE 4

| Particle size (microns) | Cumulative weight % Example No. | | | | | | | |
|---|---|---|---|---|---|---|---|---|
| | 1 | 2 | 3 | 5 | 6 | 7 | 9 | 16 |
| 209.3 | 98.85 | 100.0 | 100.0 | 100.0 | 100.0 | 100.0 | 100.0 | |
| 192.0 | | | | | | | | 100.0 |
| 148.0 | 86.99 | 100.0 | 100.0 | 100.0 | 100.0 | 100.0 | 100.0 | |

TABLE 4-continued

| Particle size | Cumulative weight % Example No. | | | | | | | |
|---|---|---|---|---|---|---|---|---|
| (microns) | 1 | 2 | 3 | 5 | 6 | 7 | 9 | 16 |
| 128.0 | | | | | | | | 98.90 |
| 104.7 | 59.53 | 100.0 | 100.0 | 100.0 | 100.0 | 100.0 | 100.0 | |
| 96.0 | | | | | | | | 95.90 |
| 74.0 | 40.30 | 100.0 | 100.0 | 100.0 | 100.0 | 100.0 | 97.41 | |
| 64.0 | | | | | | | | 89.20 |
| 52.3 | 17.63 | 100.0 | 98.23 | 100.0 | 99.80 | 98.23 | 82.16 | |
| 48.0 | | | | | | | | 85.80 |
| 37.0 | 6.35 | 99.06 | 86.51 | 100.0 | 99.80 | 85.98 | 47.34 | |
| 32.0 | | | | | | | | 73.90 |
| 26.2 | 3.57 | 89.30 | 50.87 | 100.0 | 99.38 | 48.45 | 23.25 | |
| 24.0 | | | | | | | | 60.30 |
| 18.5 | 2.33 | 63.96 | 22.13 | 97.85 | 95.96 | 19.32 | 12.01 | |
| 16.0 | | | | | | | | 41.00 |
| 13.1 | 1.42 | 36.55 | 12.06 | 86.61 | 80.20 | 9.03 | 5.64 | |
| 12.0 | | | | | | | | 31.00 |
| 9.25 | 0.67 | 22.76 | 9.53 | 62.75 | 54.54 | 6.32 | 3.02 | |
| 8.0 | | | | | | | | 17.40 |
| 6.54 | 0.00 | 17.55 | 8.73 | 44.68 | 38.91 | 5.53 | 2.05 | |
| 6.0 | | | | | | | | 11.60 |
| 4.0 | | | | | | | | 5.10 |
| 3.89 | 0.00 | 12.92 | 7.30 | 28.89 | 25.96 | 5.18 | 1.72 | |
| 3.0 | | | | | | | | 2.00 |
| 2.0 | | | | | | | | 0.60 |
| 1.94 | 0.00 | 5.74 | 2.88 | 12.03 | 11.48 | 2.90 | 1.39 | |
| 1.50 | | | | | | | | 0.00 |
| 1.16 | 0.00 | 1.33 | 0.38 | 3.49 | 2.20 | 0.85 | 0.33 | 0.00 |
| 0.69 | 0.00 | 0.00 | 0.00 | 0.33 | 0.00 | 0.00 | 0.00 | 0.00 |
| 0.49 | 0.00 | 0.00 | 0.00 | 0.00 | 0.00 | 0.00 | 0.00 | 0.00 |
| 0.24 | 0.00 | 0.00 | 0.00 | 0.00 | 0.00 | 0.00 | 0.00 | 0.00 |

We claim:

1. A catalyst component for olefin polymerization which is formed by reacting an organomagnesium compound, an alkoxy silane, and a chlorinating reagent in a single reaction step.

2. A catalyst component as claimed in claim 1 wherein the organomagnesium compound is a dialkylmagnesium compound having from about one to about eight carbon atoms in the alkyl group.

3. A catalyst component as claimed in claim 1 wherein the alkoxy silane is tetraethyl silicate.

4. A catalyst component as claimed in claim 1 wherein the chlorinating reagent is titanium tetrachloride.

5. A catalyst component as claimed in claim 1 wherein the organomagnesium compound is a dialkylmagnesium compound having from about one to about eight carbon atoms in the alkyl group, the alkoxy silane is tetraethyl silicate, and the chlorinating reagent is titanium tetrachloride.

* * * * *